United States Patent
Broms

(10) Patent No.: US 8,331,899 B2
(45) Date of Patent: Dec. 11, 2012

(54) CONTACT LIST

(75) Inventor: Hans Daniel Broms, Lund (SE)

(73) Assignee: Sony Mobile Communications AB, Lund (SE)

(*) Notice: Subject to any disclaimer, the term of this patent is extended or adjusted under 35 U.S.C. 154(b) by 1031 days.

(21) Appl. No.: 11/537,816

(22) Filed: Oct. 2, 2006

(65) Prior Publication Data

US 2008/0080687 A1    Apr. 3, 2008

(51) Int. Cl.
*H04M 11/04* (2006.01)
(52) U.S. Cl. ............................ 455/404.1; 379/38
(58) Field of Classification Search ............ 379/210.01, 379/201.01, 207.15, 38, 39, 40, 41, 42, 51, 379/142, 201.04, 207.16, 37, 142.06, 142.17, 379/216.01, 88.19, 88.2, 88.21, 88.23, 373, 379/374, 375, 207.14; 705/2.35; 340/539.18; 455/412.1, 404.1, 517, 415, 425, 556, 566, 455/461, 404.2
See application file for complete search history.

(56) References Cited

U.S. PATENT DOCUMENTS

| | | | |
|---|---|---|---|
| 6,721,406 B1* | 4/2004 | Contractor | 379/142.06 |
| 2003/0128123 A1* | 7/2003 | Sumiya et al. | 340/573.1 |
| 2004/0101118 A1* | 5/2004 | Powell | 379/142.1 |
| 2004/0152441 A1 | 8/2004 | Wong | |
| 2004/0185895 A1* | 9/2004 | Aisenberg | 455/550.1 |
| 2004/0190703 A1* | 9/2004 | Trandal et al. | 379/210.01 |
| 2004/0203622 A1* | 10/2004 | Esque et al. | 455/412.1 |
| 2004/0208304 A1* | 10/2004 | Miller | 379/210.02 |
| 2004/0227629 A1* | 11/2004 | Adamczyk et al. | 340/539.18 |
| 2004/0248597 A1* | 12/2004 | Mathis | 455/466 |
| 2005/0013426 A1* | 1/2005 | Ooki | 379/211.02 |
| 2005/0031102 A1* | 2/2005 | Kraus et al. | 379/114.2 |
| 2005/0032527 A1* | 2/2005 | Sheha et al. | 455/456.1 |
| 2005/0038724 A1* | 2/2005 | Roever et al. | 705/35 |
| 2005/0059418 A1* | 3/2005 | Northcutt | 455/517 |
| 2005/0080528 A1* | 4/2005 | Obradovich | 701/36 |
| 2005/0143048 A1* | 6/2005 | Binning | 455/404.2 |
| 2005/0151642 A1* | 7/2005 | Tupler et al. | 340/539.18 |
| 2005/0209884 A1* | 9/2005 | Gil et al. | 705/2 |
| 2005/0288002 A1* | 12/2005 | Sparks et al. | 455/418 |
| 2006/0045243 A1 | 3/2006 | Durga et al. | |
| 2006/0121938 A1* | 6/2006 | Hawkins et al. | 455/556.1 |

(Continued)

FOREIGN PATENT DOCUMENTS

DE    3128529 A1    2/1983

(Continued)

OTHER PUBLICATIONS

PCT Invitation to Pay Additional Fees /Partial International Search Report, PCT/IB2007/051178, Sep. 13, 2007, 5 pages.

(Continued)

*Primary Examiner* — Ahmad Matar
*Assistant Examiner* — Kharye Pope
(74) *Attorney, Agent, or Firm* — Snyder, Clark, Lesch & Chung, LLP

(57) ABSTRACT

A device is provided that may receive names and associated phone numbers in a contact list, and receive information to link the caller names in the contact list to an emergency contact. The device may also receive a call from a caller linked to the emergency contact and not display emergency related information. The device may also transfer the contact list to another device, wherein the emergency contact linking information remains in the transferred contact list.

18 Claims, 13 Drawing Sheets

U.S. PATENT DOCUMENTS

| | | | |
|---|---|---|---|
| 2006/0202819 A1* | 9/2006 | Adamczyk et al. | 340/539.18 |
| 2006/0217110 A1* | 9/2006 | Othmer | 455/414.1 |
| 2006/0227942 A1* | 10/2006 | Binning | 379/45 |
| 2007/0082651 A1* | 4/2007 | Loizeaux | 455/404.1 |
| 2007/0096894 A1* | 5/2007 | Lemmon | 340/506 |
| 2007/0155371 A1* | 7/2007 | Daigle | 455/418 |
| 2007/0243853 A1* | 10/2007 | Bumiller et al. | 455/404.1 |
| 2007/0254697 A1* | 11/2007 | Sugio et al. | 455/556.2 |
| 2008/0001735 A1* | 1/2008 | Tran | 340/539.22 |
| 2008/0064363 A1* | 3/2008 | Salafia et al. | 455/404.1 |

FOREIGN PATENT DOCUMENTS

| | | |
|---|---|---|
| DE | 19928666 A1 | 6/2001 |
| EP | 1069749 A1 | 1/2001 |
| WO | WO0141458 A2 | 6/2001 |

OTHER PUBLICATIONS

International Search Report and Written Opinion for corresponding PCT Application No. PCT/IB2007/051178, Dec. 11, 2007, 21 pages.

* cited by examiner

CONTACT LIST

TECHNICAL FIELD OF THE INVENTION

Implementations described herein relate generally to communication devices, and more particularly, to contact lists that may be associated with communication devices.

DESCRIPTION OF RELATED ART

Communication devices, such as mobile terminals, may be used by individuals for communicating with users of other communication devices. For example, a communication device may be used to place/receive calls and send/receive text messages to/from other communication devices having unique identifiers, e.g., phone numbers. A feature of communication devices typically includes providing a contact list of phone numbers that also includes numbers to call In Case of Emergency (ICE). However, an unwanted result of the ICE designation of a contact is that when the number stored as the ICE contact is calling, the words "In Case of Emergency" are displayed on the communication device.

SUMMARY

According to one aspect, a communication device may comprise a display, a memory to store a contact list of parties and associated numbers, wherein at least one party and associated number are linked to an In Case of Emergency (ICE) contact, and logic configured to receive a call from a party linked to the ICE contact, and control the display to display the name of the party linked to the ICE contact without displaying any information relating to an ICE designation.

Additionally the logic is further configured to receive a number associated with the received call, and control the display to display the received number.

Additionally, the logic is further configured to search the contact list using the received number to identify a name associated with the received number, and control the display to display the identified name.

Additionally, the more than one party and associated number are linked to the ICE contact.

Additionally, the ICE contact is automatically provided in the contact list in the memory.

According to another aspect, a method may be provided. The method may comprise storing names and associated phone numbers in a contact list, receiving information to link at least one of the names or associated phone numbers in the contact list to an emergency contact designator, receiving a call from a caller linked to the emergency contact designator, and displaying at least one of the name of the caller or phone number of the caller and not displaying an emergency designation associated with the call.

Additionally, the method further comprises receiving a phone number associated with the received call, and displaying the phone number.

Additionally, the method further comprises searching the contact list for the received phone number.

Additionally, the method further comprises automatically providing an emergency contact entry in the contact list.

Additionally, the method further comprises receiving information to link a plurality of names and associated phone numbers to the emergency contact designator.

According to another aspect, a communication device is provided. The communication device may comprise a display, a memory to store a contact list of parties and associated numbers, wherein the contact list automatically includes an In Case of Emergency (ICE) contact entry, and logic configured to receive linking information that links at least one of the parties and associated number to the ICE contact entry, and control the display to display parties and associated numbers and information identifying the at least one party as an ICE contact.

Additionally, the automatically included ICE contact entry is preprogrammed in the memory.

Additionally, the logic is further configured to receive a call from a caller linked to the ICE contact entry and display only the caller's name.

Additionally, a plurality of names and associated numbers are linked to the ICE contact entry.

Additionally, the logic is further configured to receive input from a user to display the parties and the associated numbers and the linking information to the ICE contact entry.

Additionally, a method is provided. The method comprises storing names and associated numbers in a contact list, automatically providing an emergency contact entry in the contact list, and receiving information that links at least one name an associated number to the emergency contact entry.

Additionally, the method further comprises storing the information that links the at least one name and associated number to the emergency contact entry in the contact list.

Additionally, the method further comprises displaying the information that identifies the names and associated numbers associated with the emergency entry.

Additionally, the method further comprises receiving a call from a caller linked to the emergency contact entry and displaying the caller's name without displaying any emergency related information.

Additionally, the method further comprises transferring the contact list to a communication device, wherein the communication device receives and stores the contact list.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of the embodiments refers to the accompanying drawings. The same reference numbers in different drawings may identify the same or similar elements. Also, the following detailed description does not limit the embodiments.

Exemplary Communication Device

Figure 1:
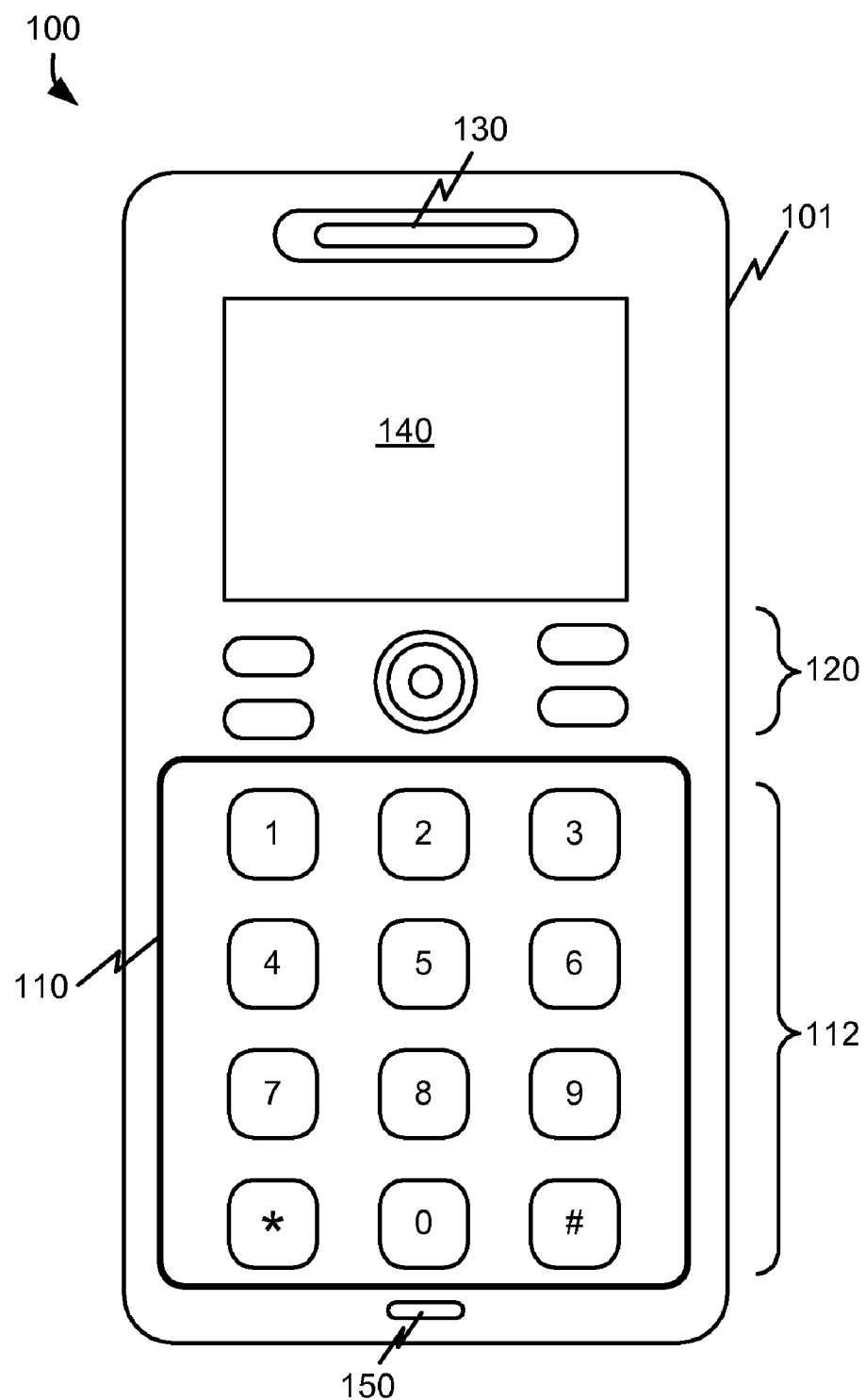
FIG. 1 is a diagram of an exemplary implementation of a communication device.

FIG. 1 is a diagram of an exemplary implementation of a communication device consistent with the principles of the embodiments. Communication device 100 (hereinafter communication device 100) may be a mobile communication device. As used herein, a "communication device" and/or "communication terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; a laptop; a palmtop receiver and/or another type of communication device.

Communication device 100 may include housing 101, keypad 110, control keys 120, speaker 130, display 140, and microphone 150. Housing 101 may include a structure configured to support and protect devices and components used in communication device 100. For example, housing 101 may be formed from plastic, metal, or composite and may be configured to support keypad 110, control keys 120, speaker 130, display 140 and microphone 150.

Keypad 110 may include devices and/or logic that can be used to operate communication device 100. Keypad 110 may further be adapted to receive user inputs, directly or via other devices, such as a stylus for entering information into communication device 100. In one implementation, communication functions of communication device 100 may be controlled by activating keys 112. Implementations of keys 112 may have key information associated therewith, such as numbers, letters, symbols, etc. A user may interact with keys 112 to input key information into communication device 100. For example, a user may operate keys 112 to enter digits, commands, and/or text, into communication device 100, which may create, store and display information in a contact list. Designated functions of keys 112 may also form and/or manipulate images that may be displayed on display 140.

Control keys 120 may include buttons that permit a user to interact with communication device 100 to cause communication device 100 to perform specified actions, such as to display a contact list via display 140, scroll through the contact list, select one or more of the displayed numbers on the contact list, place a call to the selected number, etc.

Speaker 130 may include a device that provides audible information to a user of communication device 100. Speaker 130 may be located anywhere on communication device 100 and may function, for example, as an earpiece when a user communicates using communication device 100. Speaker 130 may also function as an output device for music and/or audio information associated with games and/or video images played on communication device 100.

Display 140 may include a device that provides visual images to a user. For example, display 140 may provide graphic information regarding incoming/outgoing calls, text messages, games, phonebooks, the current date/time, volume settings, etc., to a user of communication device 100. Implementations of display 140 may include black and white or color flat panel displays, such as liquid crystal displays.

Microphone 150 may include a device that converts speech or other acoustic signals into electrical signals for use by communication device 100. Microphone 150 may be located anywhere on communication device 100 and may be configured, for example, to convert spoken words or phrases into electrical signals for use by communication device 100.

Figure 2:
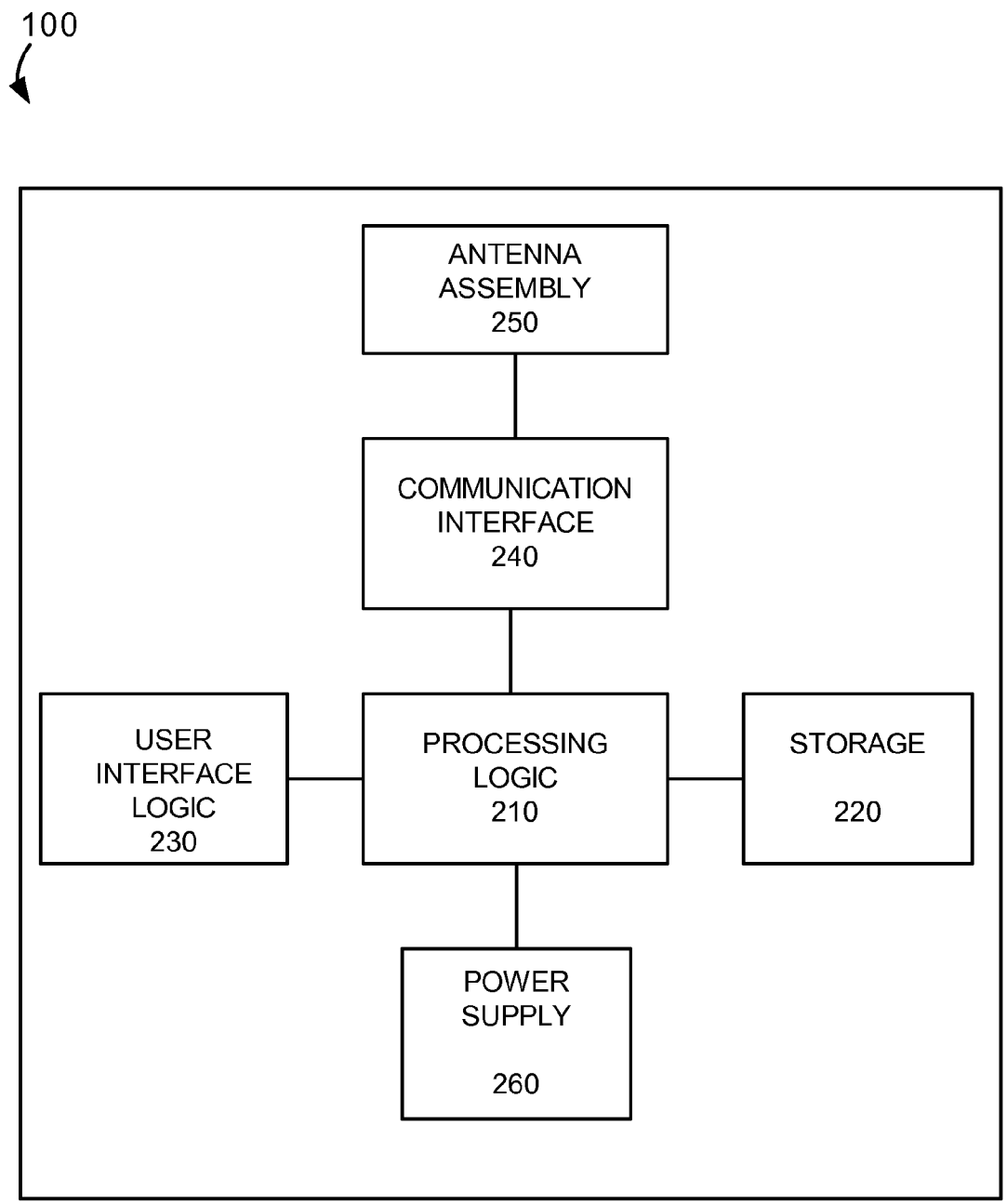
FIG. 2 illustrates an exemplary functional diagram of the communication device of FIG. 1.

FIG. 2 illustrates an exemplary functional diagram of a communication device, such as communication device 100, consistent with the principles of the invention. As shown in FIG. 2, communication device 100 may include processing logic 210, storage 220, user interface logic 230, communication interface 240, antenna assembly 250, and power supply 260.

Processing logic 210 may include a processor, microprocessor, an application specific integrated circuit (ASIC), field programmable gate array (FPGA), or the like. Processing logic 210 may include data structures or software programs to control operation of communication device 100 and its components. Implementations of communication device 100 may use an individual processing logic component or multiple processing logic components, such as processing logic components operating in parallel.

Storage 220 may include a random access memory (RAM), a read only memory (ROM), and/or another type of memory to store data and instructions that may be used by processing logic 210.

User interface logic 230 may include mechanisms, such as hardware and/or software, for inputting information to communication device 100 and/or for outputting information from communication device 100. For example, user interface logic 230 may include keys 112 and control keys 120.

Communication interface 240 may include, for example, a transmitter that may convert base band signals from processing logic 210 to radio frequency (RF) signals and/or a receiver that may convert RF signals to base band signals. Alternatively, communication interface 240 may include a transceiver to perform functions of both a transmitter and a receiver. Communication interface 240 may connect to antenna assembly 250 for transmission and reception of the RF signals. Antenna assembly 250 may include one or more antennas to transmit and receive RF signals over the air. Antenna assembly 250 may receive RF signals from communication interface 240 for transmitting over the air, and receive RF signals over the air for conveying to communication interface 240.

Power supply 260 may include hardware and/or software to provide power to components of communication device 100. For example, power supply 260 may include one or more batteries and/or connections to receive power from other devices, such as an accessory outlet in an automobile, an external battery, or a wall outlet. Power supply 260 may also include metering logic to provide the user and components of communication device 100 with information about battery charge levels, output levels, power faults, etc.

As will be described in detail below, communication device 100, consistent with the embodiments described herein, may perform certain operations relating to dynamically configuring a displayable contact list in response to user inputs and/or in response to instructions associated with processing logic 210. Communication device 100 may perform such operations in response to processing logic 210 executing software instructions associated with a contact list application contained in a computer-readable medium, such as storage 220. A computer-readable medium may be defined as a physical or logical memory device and/or carrier wave.

The software instructions may be read into storage 220 from another computer-readable medium or from another device via communication interface 240. The software instructions contained in storage 220 may cause processing logic 210 to perform processes that will be described later. Alternatively, hardwired circuitry may be used in place of or in combination with software instructions to implement processes consistent with the principles described herein. Thus, implementations consistent with the embodiments described herein are not limited to any specific combination of hardware circuitry and software.

Exemplary Contact List Data Structure

Figure 3:
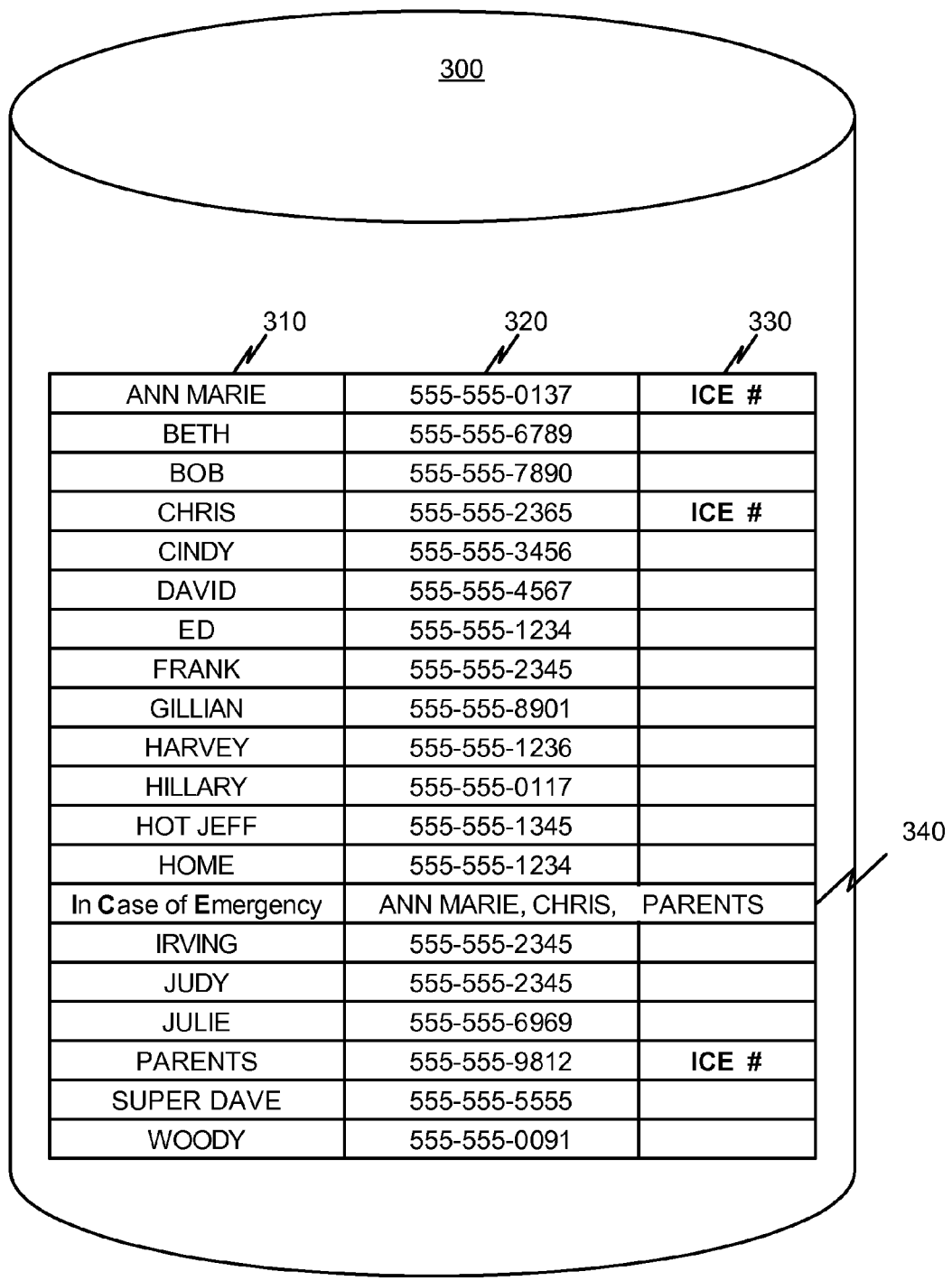
FIG. 3 illustrates an exemplary contact list data structure.

FIG. 3 illustrates an exemplary contact list 300 consistent with the principles of the embodiments described herein. Contact list 300 may include a computer-readable medium that can be used to store information in a machine-readable format. In an exemplary implementation, contact list 300 may store information that is used to form a displayable list on display 140. In one implementation, contact list 300 may be stored in storage 220. In another exemplary implementation, contact list 300 may be used to form displayable names and/or numbers when an incoming call is received by communication device 100.

Contact list 300 may include a list of names, numbers and other information that may be arranged in individual entries (shown here as rows) in fields (shown here in columns), such as a name field 310, a number or caller identifier (CID) field 320, and a linking field 330. Contact list 300 may also include one or more In Case of Emergency (ICE) entries/contacts illustrated by entry 340 in contact list 300. The information in contact list 300 may be arranged in any format.

Name field 310 may include information that identifies a name associated with a phone number that may be called or received by communication device 100. The information in name field 310 may be entered by a user of communication device 100 through a contact list menu for example, using keys 112 on keypad 110. The names in name field 310 may be stored and displayed in alphabetical order, for example. Once a name is entered in name field 310, a user may save the name using control keys 120 and/or may be prompted to enter a phone number associated with the name. Also, for example, a number may be dialed or entered by a user of communication device 100, and then the user may be automatically prompted to enter and save a name associated with the number in the contact list 300. In this example, a user may then enter a name that may be stored in name field 310 with the associated number in contact list 300.

Number field 320 may include information that identifies a phone number with an associated name in name field 310, for example. Number field 320 may include information, such as a phone number, an e-mail address, etc., that is uniquely associated with a communication device, for example. The number stored in number field 320, for example, may also be referred to as a caller identifier (CID).

Linking field 330 may include information and/or a phone number that links the associated names and numbers stored in fields 310 and 320, respectively, to ICE contact 340. In one implementation, information in linking field 330 may be entered after a user has entered a name and number in fields 310 and 320 respectively. For example, a user may be prompted to link a contact (name and associated number) to ICE contact 340, by affirmatively responding to a query such as "Do you want to contact this person in case of emergency?" In another implementation, a user may enter linking information into linking field 330 by directly accessing ICE contact 340. In this example, "ICE" is shown to indicate the stored linking information in linking field 330. In other embodiments, a user's own phone number may also be contained in linking field 330 in order to provide identification of a user that has designated the contact as an ICE contact, for example. This exemplary embodiment may enhance scenarios where contact list 300 may be transmitted to another communication device or computer, for example.

In Case of Emergency (ICE) contact 340 may be an entry contained in contact list 300. In one embodiment, ICE contact 340 is a preprogrammed entry that is automatically provided in contact list 300. For example, when a user selects a "Contact List" choice from a menu of choices, ICE contact 340 may be automatically presented in the contact list 300. However, no names and numbers may be linked to ICE contact 340. A user of communication device 100 may then link other contacts to this automatically provided ICE entry/contact 340 as described below. In other embodiments, ICE contact 340 may be a virtual entry or may not be visible until other contacts have been linked to ICE contact 340. In still further embodiments, linking a contact to ICE contact 340 may be available to a user via a menu or tabbed pane relating to a contact contained in contact list 300.

In another embodiment for example, contact list 300 may be transmitted to or received from a computer. In this exemplary embodiment, the information that is contained in a contact list 300 may be entered from a computer and downloaded into communication device 100, or contact list 300 may be entered into communication device 100 (using the exemplary method described in FIG. 4) and downloaded and stored into a computer or another communication device, for example. Also for example, a contact list 300 may be received through communication interface 240 via an IrDA/Bluetooth connection and may be stored in storage 220. After contact list 300 may be received and stored using any of the exemplary embodiments described above, a user of communication device 100 may access and display contact list 300 as described below with respect to FIGS. 4-6, for example.

Exemplary Contact List Processing

Figure 4:
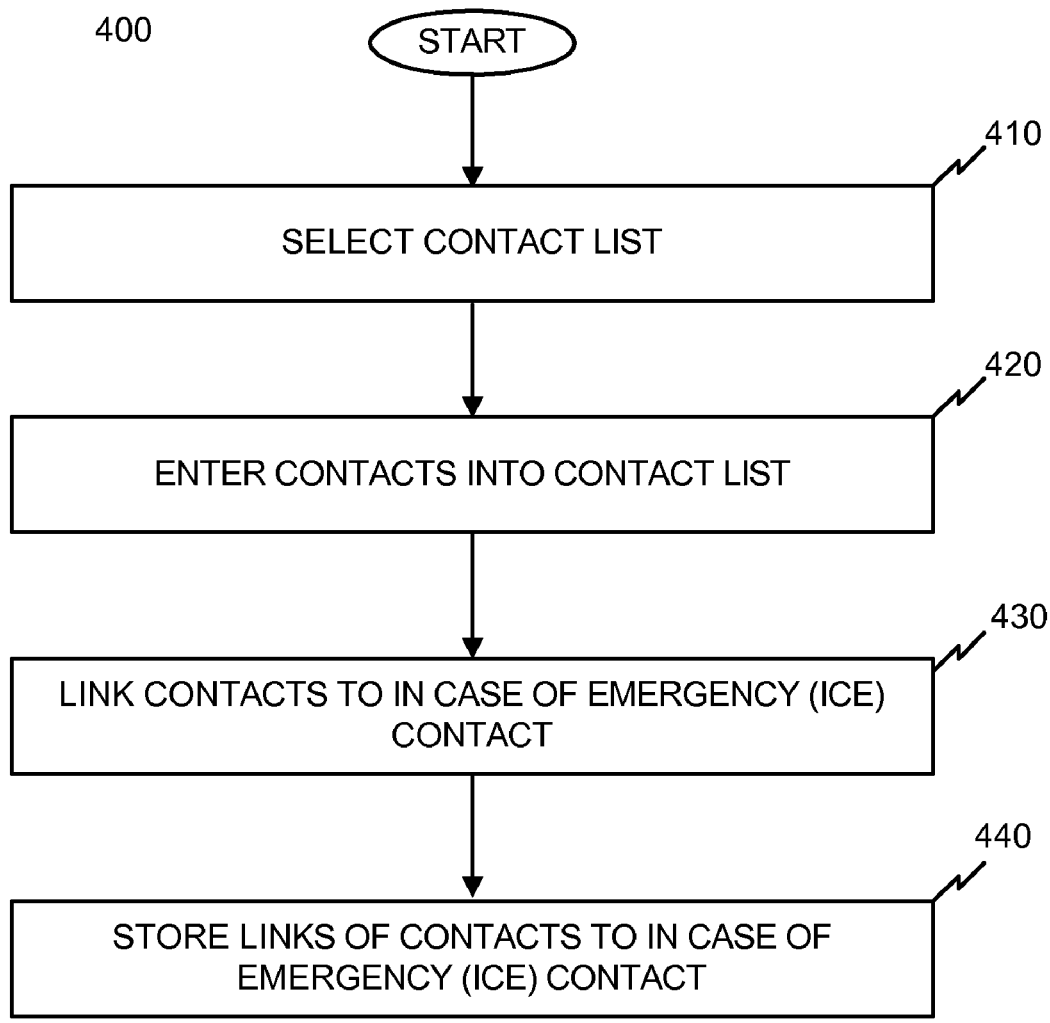
FIG. 4 illustrates an exemplary flow diagram of a creating and linking contact list information.

FIG. 4 is a flowchart of an exemplary process 400 consistent with implementations to create a contact list. Process 400 may begin, for example, when a user of communication device 100 selects a contact list feature (act 410). A contact list feature of communication device 100 may be selected from a displayed menu of choices, for example, or may be selected by a "contacts" choice that may be displayed via display 140. Once the contact list feature has been selected, a user of communication device 100 may begin to enter contacts into contact list (act 420). An example of entering contact information is shown in detail in FIG. 7A.

Figure 7A:
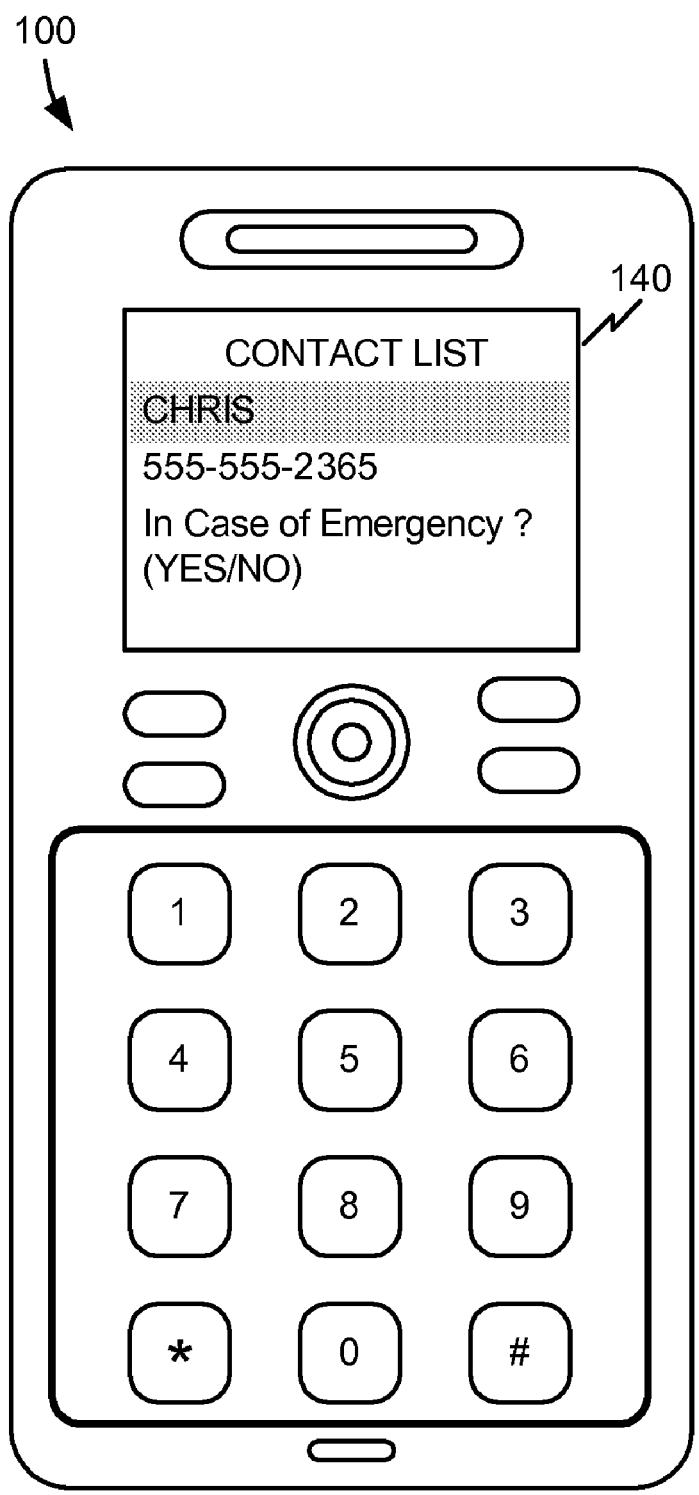
FIGS. 7A-7F illustrate exemplary displays of contact list information.

Using keys 112 for example, a user may enter contact names and phone numbers associated with the name of the contact. Referring to FIG. 7A, an exemplary contact name is "Chris" and the associated telephone number is 555-555-2365. Once entered, the contact names and associated numbers may be stored in contact list 300, as shown in FIG. 3. After entering a contact name and number for example, a user of communication device 100 may be prompted to link this contact to the automatically provided ICE contact 340. For example, a text message "In Case of Emergency?" may be displayed via display 140. The user may select from choices "YES" and "NO," in response to this prompt. If the user selects "YES," for example, the contact list feature/application provides linking information so that the contact name and associated number may be linked to ICE contact 340 (act 430). The linking information may then be stored in linking field 330 in exemplary contact list 300 (act 440).

Figure 7B:
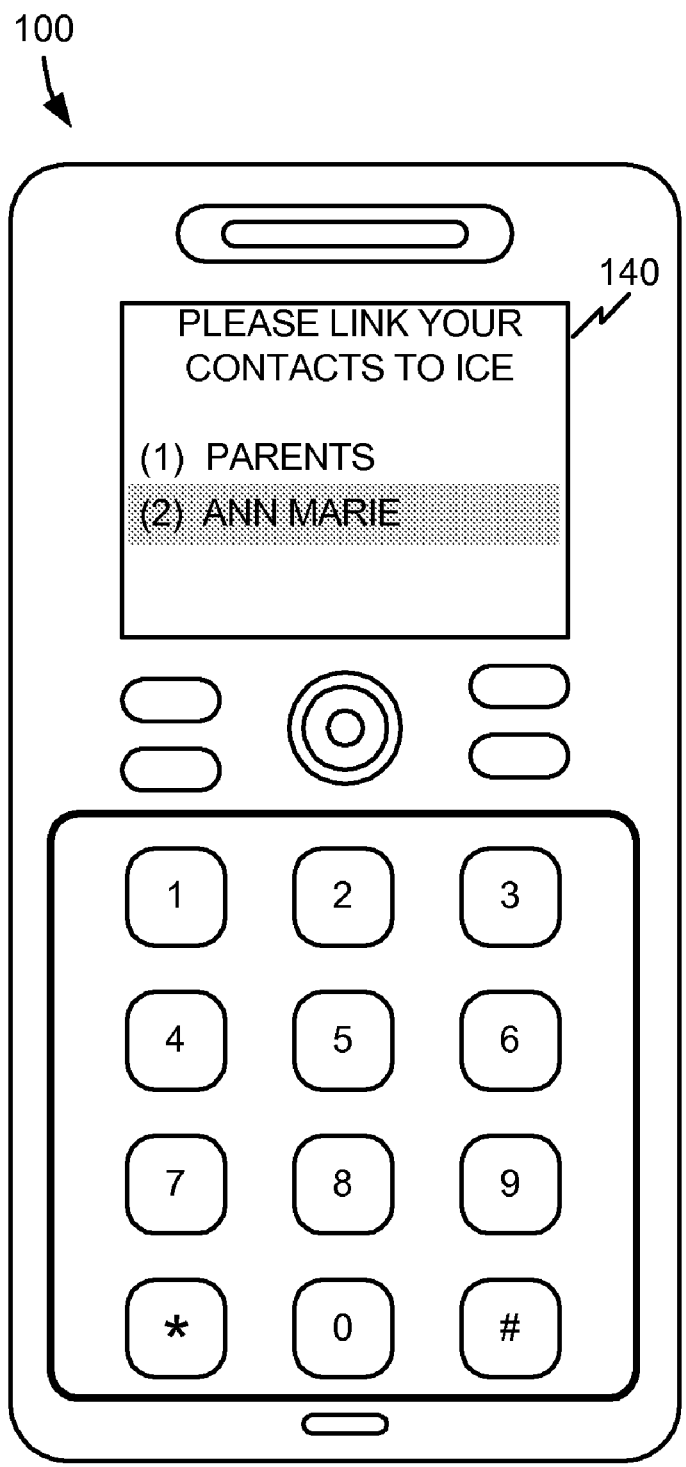

In another implementation, a user may have previously entered contact information and chose not to link the contact to ICE contact 340. Referring to FIG. 7B, a user may later choose to link existing contacts to ICE contact 340, for example. In this example shown in FIG. 7B, previously entered contacts "Parents" and "Ann Marie" may be linked to ICE contact 340 (act 430). For example, by selecting ICE contact using control keys 120, a user may be prompted by a text message "Please Link Your Contacts to ICE". In this example, the entered names of contacts may then be linked to ICE contact 340 (act 430). These entered contacts may then be linked to ICE contact 340 by storing linking information in linking field 330 (act 440).

Once entered and stored in contact list 300, the information in contact list 300 may be used for a plurality of purposes, such as to display contact list information to a user, to display emergency contact information, or to display names and/or numbers of callers to the user of communication device 100, for example.

Figure 5:
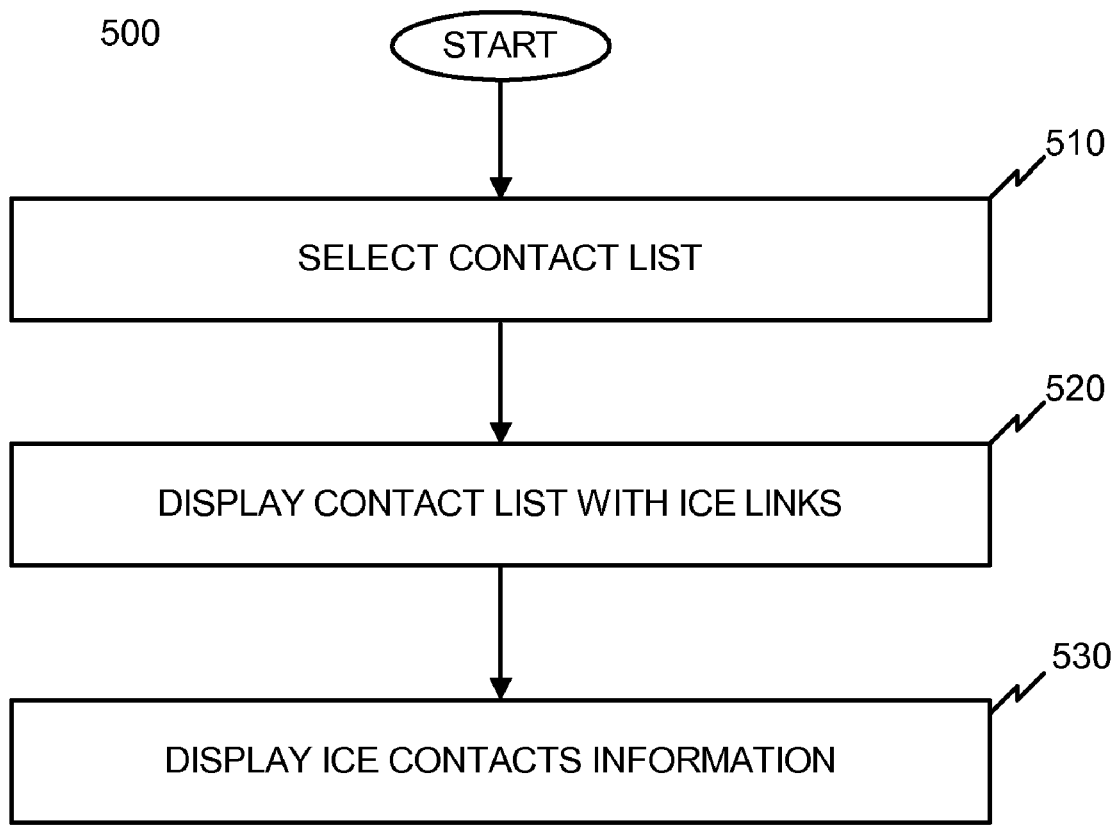
FIG. 5 illustrates an exemplary flow diagram of displaying contact list information.

FIG. 5 is a flowchart of an exemplary process 500 consistent with implementations to display a contact list. Process 500 may begin, for example, when a user of communication device 100 selects a contact list feature (act 510). A contact list feature of communication device 100 may be selected from a displayed menu of choices, for example, or may be selected by a "contacts" choice that may be displayed via display 140. Once the contact list feature has been selected, a user of communication device 100 may select to display the contact list with ICE linking information (act 520). An example of displaying a contact list is shown in FIG. 7C.

Figure 7C:
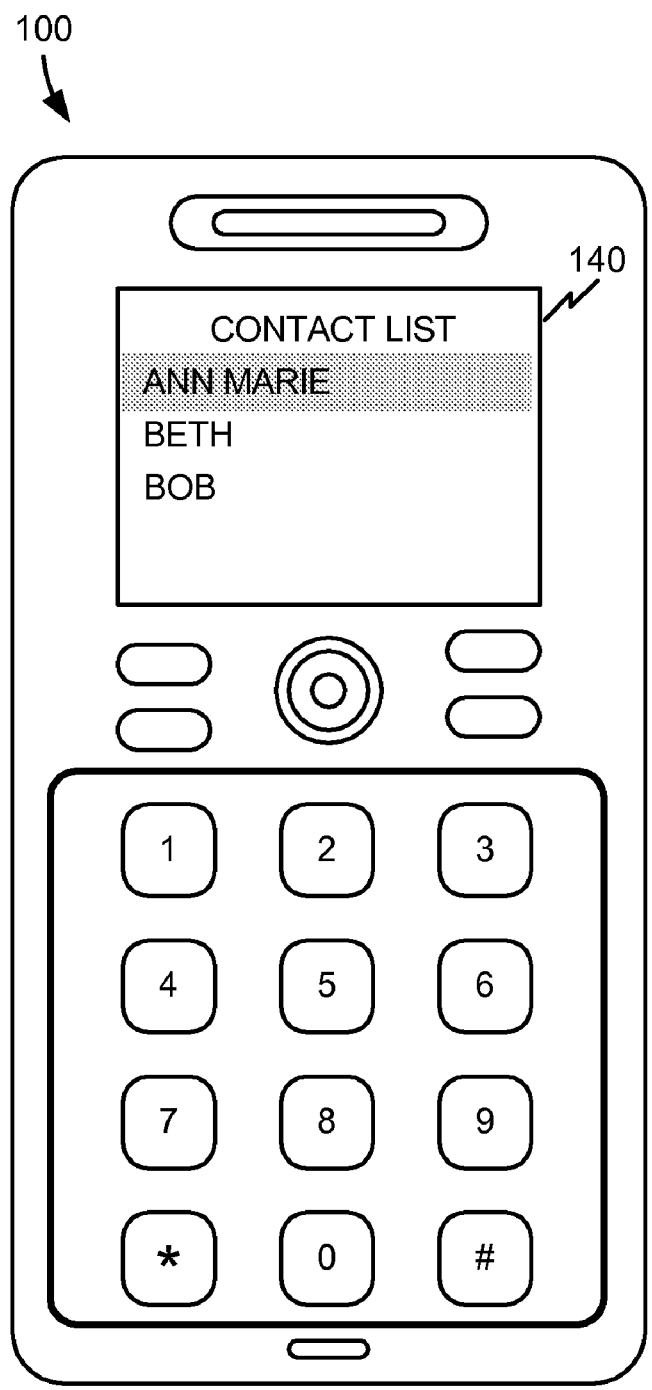

Referring to FIG. 7C, the contact list of names may be displayed via display 140 in alphabetical order, for example. In this example, the contacts "Ann Marie," "Beth" and "Bob" may be displayed to the user of communication device 100. Using control keys 120, a user may highlight "Ann Marie" and call the associated number by selecting this highlighted choice, for example.

Figure 7D:

Process 500 may also include displaying ICE contact 340 information (act 530). As shown in FIG. 7D for example, a user may scroll through the names in contact list 300 and select the ICE entry/contact 340 with control keys 120. In this example, all the names and numbers in contact list 300 that may be linked to ICE contact 340, may be displayed via display 140 (act 530). In this example, the contacts "Ann Marie" and "Chris" may be displayed with their respective phone numbers, as contacts that may be used in case of an emergency.

Figure 6:
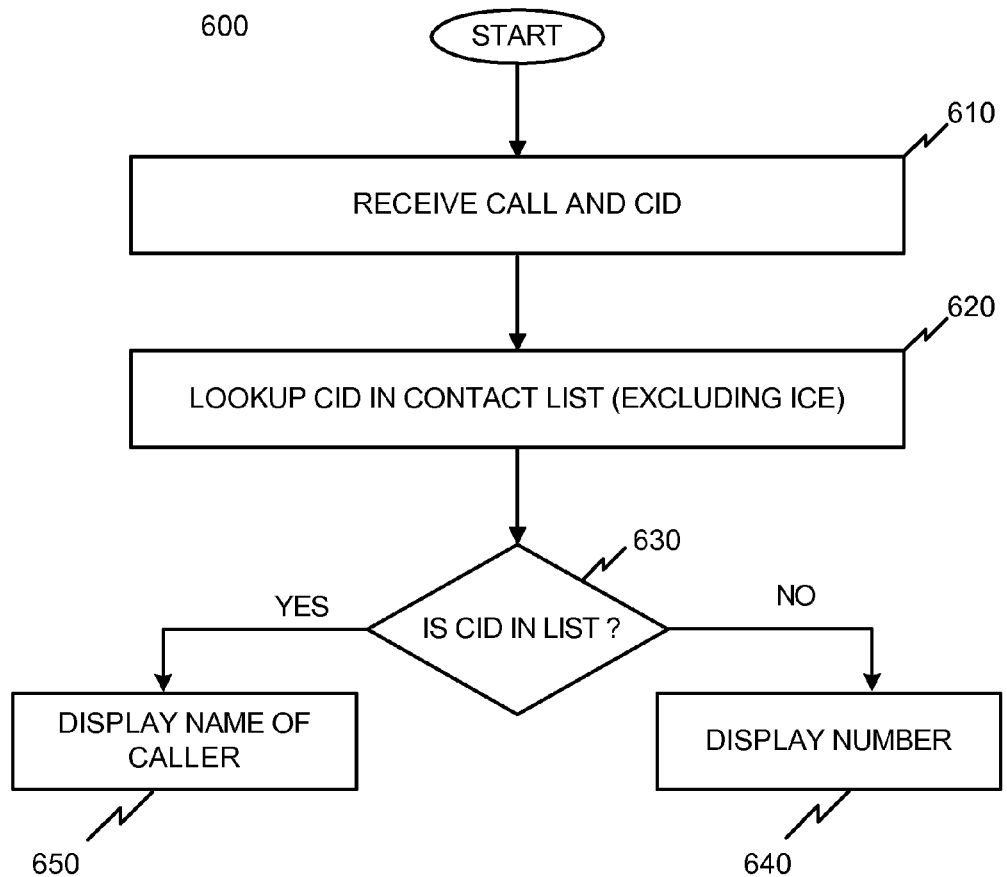
FIG. 6 illustrates an exemplary flow diagram of displaying contact list information in response to receiving an incoming call.

FIG. 6 is a flowchart of an exemplary process 600 to display a name or number of a caller using a contact list. Process 600 may begin when communication device 100 receives an incoming call that includes the calling phone number and/or caller identifier (CID) (act 610). Using the received CID for example, communication device 100 may lookup the CID in the stored contact list without looking at the ICE contact 340 (act 620). After looking up the CID in contact list 300 for example, communication device 100 determines if the CID is contained in the contact list (act 630). If the CID is not in the number field 320 of contact list 300, then only the CID is displayed to the user via display 140 (act 640). For example, an unknown person may place a call to communication device 100 where the person's associated CID or telephone number is not contained in contact list 300. In this case, only the CID or caller's number is displayed.

If for example, the received CID is contained in contact list 300, the name of the caller associated with the CID may also be displayed (act 650). For example, if Beth places a call to communication device 100, the call may be received along with Beth's associated CID (555-555-6789). The received CID is looked up in contact list 300 and the name "Beth" may be associated with the received CID. "Beth" may then be displayed via display 140 (act 650). Beth's number and/or CID may also be displayed.

If for example, "Parents" may be calling communication device 100, the received CID associated with the "Parents" contact is looked up in contact list 300 (acts 610 and 620). In this example, although the "Parents" contact may be linked to ICE contact 340 via linking information in field 330, when "Parents" call communication device 100, "In Case of Emergency," or similar information may not be displayed, via display 140. In this example only the contact's name, "Parents" may be displayed via display 140 (act 650). An example of displaying contact names linked to ICE contact without displaying ICE contact information is shown in FIG. 7F. In this example, "Incoming Call From" "Parents" is shown via display 140. However, no "In Case of Emergency" label is displayed to the user of communication device 100 via display 140.

EXAMPLES

FIGS. 7A-7F illustrate exemplary displays on communication device 100 that may be generated using the methods described in FIGS. 4-6. FIG. 7A shows an exemplary display 140 of communication device 100 that may be generated using the method described in FIG. 4. The exemplary display 140 contains the contact name "Chris" and the associated telephone number 555-555-2365. Once entered, the contact names and associated numbers may be stored in contact list 300, as shown in FIG. 3. After entering a contact name and number for example, user of communication device 100 may be prompted to link this contact to ICE contact 340. For example, a text message "In Case of Emergency?" may be displayed via display 140. The user may select from choices "YES" and "NO," in response to this prompt. If the user selects "YES," the contact name and associated number may be linked to ICE contact 340.

FIG. 7B shows an exemplary display 140 of communication device 100 generated using the method described in FIG. 4, for example. In this example shown in FIG. 7B, previously entered contacts "Parents" and "Ann Marie" may be linked to ICE contact 340. For example, by selecting ICE contact using control keys 120, a user may be prompted by a text message "Please Link Your Contacts to ICE". In this example, the entered names of contacts may then be linked to ICE contact 340. These contacts may then be linked to ICE contact 340 by storing linking information as shown in FIG. 3.

FIG. 7C shows an exemplary display 140 of communication device 100 generated using the method described in FIG. 5. In this example, the contacts "Ann Marie," "Beth" and "Bob" may be displayed to the user of communication device 100. In this example, there is no linking information displayed with the "Ann Marie" contact, indicating to a user that "Ann Marie" is to be contacted in an emergency. In other embodiments, "ICE" may be displayed next to the contact name if they may be used as an emergency contact. The contact list may be displayed a portion at time on display 140. That is, a limited number of contacts may be displayed at once. In one implementation, a user may use keys 112, control keys 120, and/or another component in communication device 100 to display further portions of the contact list. For example, the displayed contact list may be scrolled or otherwise navigated using keys 112, control keys 120, and/or another component in communication device 100 and processed by user interface logic 230.

FIG. 7D shows an exemplary display 140 of communication device 100 generated using the method described in FIG. 5. In this example, all the names and numbers in contact list 300 linked to ICE contact 340 may be displayed via display 140. This exemplary display 140 may be presented to a user after using control keys 120 to highlight and select ICE contact 340 from a displayed contact list. In this example, the contacts "Ann Marie" and "Chris" may be displayed to the user of communication device 100. In this example, a "Parents" contact may also be linked to ICE contact 340, that may be viewed by scrolling through ICE contact entries using control keys 120, for example. Using control keys 120, a user may highlight "Ann Marie" or one of the other contacts and call the associated number by selecting the highlighted choice, for example.

Figure 7E:
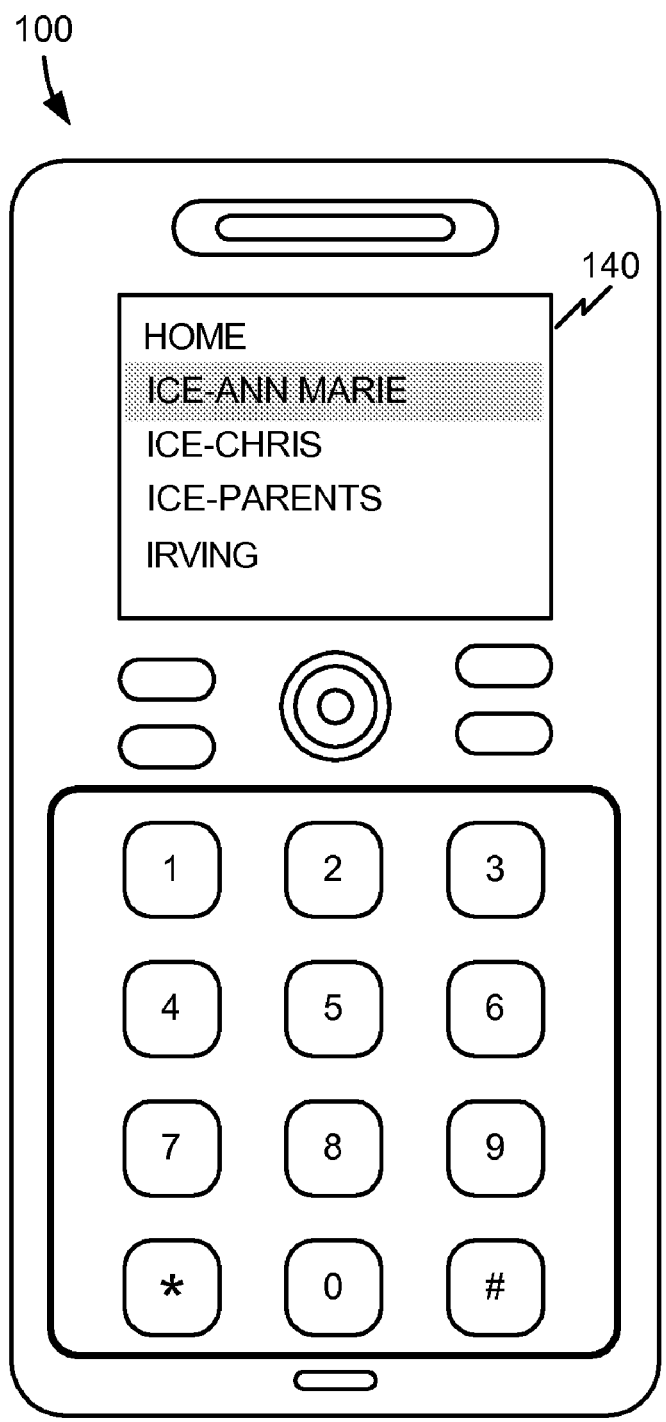
Figure 7F:
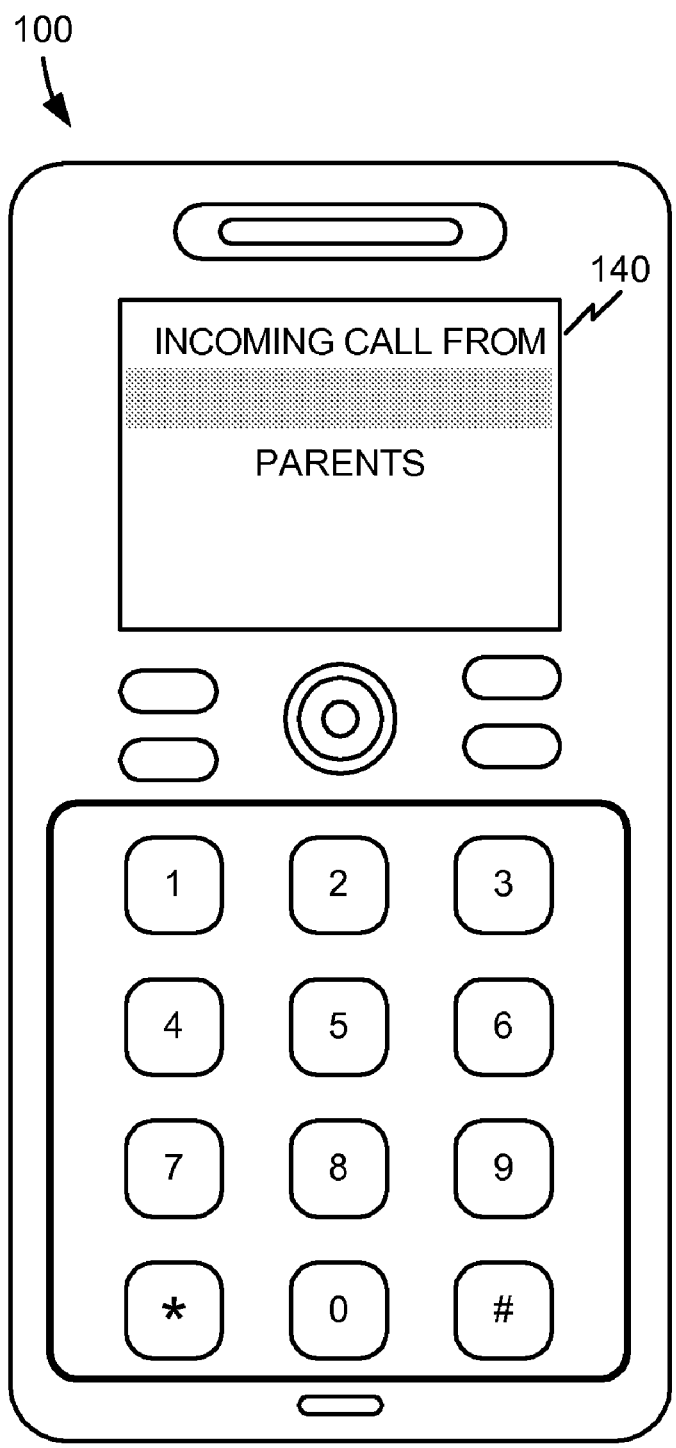

FIG. 7E shows another exemplary display 140 of communication device 100 generated using the method described in FIG. 5. In this example, the names and numbers in contact list 300 may be displayed via display 140. This exemplary display 140 may be presented to a user by using control keys 120 to highlight and select a "contact list" feature. In this example, the contacts may be displayed in alphabetical order as "Home," "ICE-Ann Marie," "ICE-Chris," "ICE-Parents" and "Irving." In this example, each contact linked to ICE contact 340 is shown as a separate entry in contact list 300.

FIG. 7F shows an exemplary display 140 of communication device 100 that may be generated using the method described in FIG. 6. In this exemplary display 140, the displayed information "Incoming Call From" "Parents" is shown. In this example, a "Parents" contact may be linked to ICE contact 340, however, there is no information displayed that may identify that the calling contact (Parents) is for "In Case of Emergency" purposes.

Figure 8:
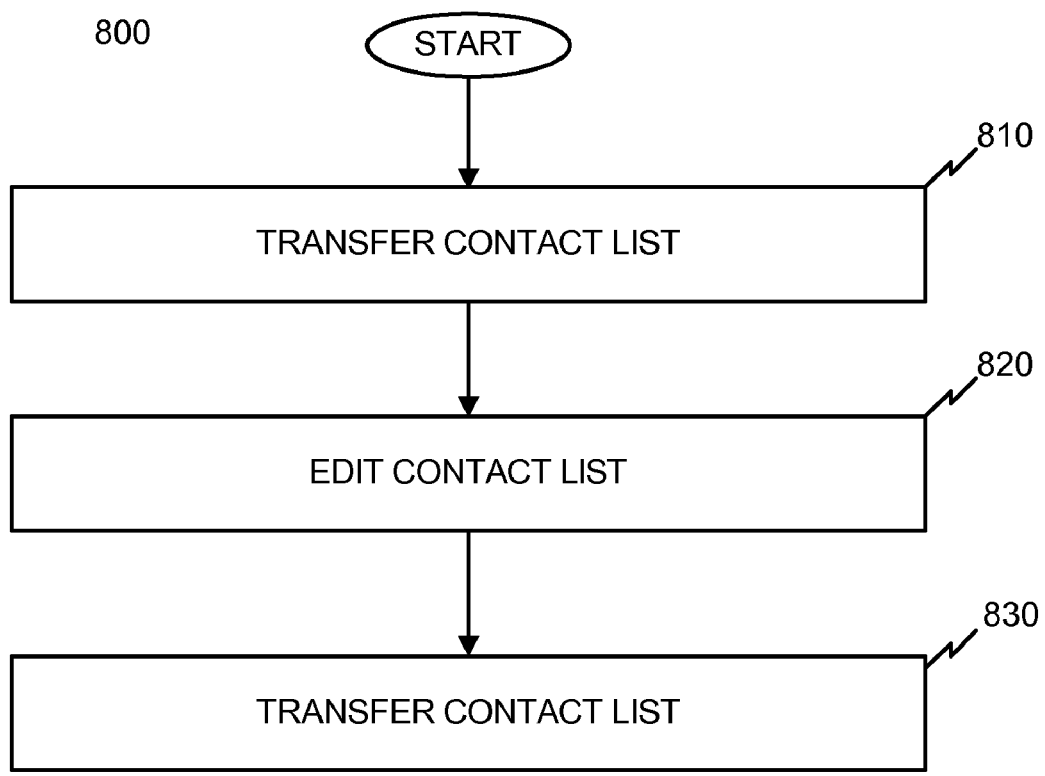
FIG. 8 illustrates an exemplary flow diagram of transferring contact list information.

FIG. 8 is a flowchart of an exemplary process 800 to transfer a contact list. Process 800 may begin when a user transfers contact list 300 to another communication device (act 810). For example, contact list 300 may be transmitted by a wired or wireless connection to another portable communication device or may be transmitted to a computer. After contact list 300 has been received by another device, it may be edited by another user (act 820). For example, another user may enter, edit and/or display contact list 300 as described above with reference to FIGS. 4-5. After contact list 300 has been received and/or edited by another user, it may be transferred to another communication device (act 830). For example, user A may transmit contact list 300 to user B (act 810) and user B may then transmit contact list 300 back to user A. This exemplary process 800 may be repeated a plurality of times as desired. In this embodiment for example, linking information stored in column 330 may include the user's phone number along with the "ICE" designation, in order to identify the particular user that has designated the contact as an ICE contact.

For example, user A may designate contacts B and C as ICE contacts that include user A's phone number in linking information 330. Then for example, user A may transmit contact list 300 to user B (act 810). Information that user B may be designated as an ICE contact (for user A) may not be displayed on user B's communication device, however, the linking information (that includes user A's phone number) that user A has linked user B as an ICE contact remains stored in linking information 330. Then for example, user B may add new ICE contacts to list 300 in act 820. For example, user B may designate user C as an ICE contact, where user B's phone number may be included in linking field 330. When contact list 300 may be transmitted back to user A from user B (act 830), user A's original ICE contact information (designating B and C) may still remain in contact list 300. In this exemplary embodiment, the ICE contact information entered by user B may not be displayed on user A's communication device, however user B's ICE contact information may remain stored in contact list 300. Process 800 may therefore allow transferring of contact lists between users and communication devices, wherein ICE contact designations may be displayed on the appropriate communication device, for example.

CONCLUSION

Implementations consistent with the embodiments described herein may provide a contact list that automatically provides an ICE contact or an ICE contact entry that may be used to link various contacts to the ICE contact entry. Implementations described herein may also produce a displayable contact list to a user of a communication device that may further provide displayable information when contacts call the communication device. In addition, "In Case of Emergency" labels may not be displayed via the communication device when an incoming call is received from a designated ICE contact.

The foregoing description of preferred embodiments of the embodiments provides illustration and description, but is not intended to be exhaustive or to limit the embodiments to the precise form disclosed. Modifications and variations are possible in light of the above teachings or may be acquired from practice of the implementations.

While series of acts have been described with regard to FIGS. 4-6 and 8, the order of the acts may be modified in other implementations consistent with the principles of the embodiments. Further, non-dependent acts may be performed in parallel.

It will be apparent to one of ordinary skill in the art that aspects of the implementations, as described above, may be implemented in many different forms of software, firmware, and hardware in the implementations illustrated in the figures. The actual software code or specialized control hardware used to implement aspects consistent with the principles of the embodiments is not limiting of the embodiments. Thus, the operation and behavior of the aspects were described without reference to the specific software code—it being understood that one of ordinary skill in the art would be able to design software and control hardware to implement the aspects based on the description herein.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A communication device comprising:
   a display;
   a memory to store a contact list of parties and associated numbers, wherein the party and associated numbers are linked within the memory to In Case of Emergency (ICE) contact designations for multiple users, and wherein the ICE contact designations include linking information to associate each of the ICE contact designations with a particular phone number of one of the multiple users; and
   a processor to:
   control the display to display one of the ICE designations with the name of the at least one party linked to the one of the ICE designations, when the communication device receives a user selection of a contact list feature to display a portion of the contact list including the at least one party linked to the one of the ICE designations and when the particular phone number matches a phone number for the communication device;

control the display to display the one of the ICE designations without the name of the at least one party linked to the one ICE designations, when the communication device receives a user selection of a contact list feature to display a portion of the contact list including the at least one party linked to the one of the ICE designations and when the particular phone number does not match the phone number for the communication device; and control the display to display the name of the at least one party linked to the one of the ICE designations, without displaying the one of the ICE designations, in response to the communication device receiving a call from the at least one party linked to the one of the ICE designations.

2. The communication device of claim 1, where the processor is further configured to:
receive a number associated with the received call; and
control the display to display the received number.

3. The communication device of claim 2, where the processor is further configured to:
search the contact list using the received number to identify a name associated with the received number; and
control the display to display the identified name.

4. The communication device of claim 1, where more than one party and associated number are linked to the one of the ICE designations.

5. The communication device of claim 1, where the processor is further configured to generate a separate ICE contact, associated with the at least one party linked to the ICE designation in the contact list in the memory.

6. A method comprising:
storing, by a communication device, names and associated phone numbers in a contact list;
receiving, by the communication device, information to link at least one of the names or associated phone numbers in the contact list to an emergency contact designator for a particular phone number associated with a user;
receiving, by the communication device, a request to present the contact list;
displaying, by the communication device and in response to the request to present the contact list, the at least one of the names or associated phone numbers with information relating to the emergency contact designator for the communication device when the particular phone number matches a phone number for the communication device;
displaying, by the communication device and in response to the request to present the contact list, the at least one of the names or associated phone numbers without information relating, to the emergency contact designator when the particular phone number does not match the phone number for the communication device;
receiving, by the communication device, a call from a caller linked to the emergency contact designator; and
displaying, by the communication device and in response to receiving the call, at least one of the name of the caller or phone number of the caller and not displaying the emergency contact designator associated with the caller.

7. The method of claim 6, further comprising:
receiving a phone number associated with the received call; and
displaying the phone number.

8. The method of claim 7, further comprising:
searching the contact list for the received phone number.

9. The method of claim 6, further comprising:
automatically providing the emergency contact designator in the contact list.

10. The method of 6, further comprising:
receiving information to link a plurality of names and associated phone numbers to the emergency contact designator.

11. A communication device comprising:
a display;
a memory to store a contact list of parties and associated numbers, wherein the contact list automatically includes an In Case of Emergency (ICE) contact entry; and
a processor configured to:
receive, from another communication device, the contact list including linking information that links one of the parties and an associated number to the ICE contact entry, wherein the ICWE contact entry is associated with a particular phone number for a communication device;
identify, based on the particular phone number, if the ICE contact entry is appropriate for a user of the communication device;
control the display to display parties and the associated numbers and information identifying the one party as an ICE contact when the particular phone number matches a phone number of the communication device; and
control the display to display parties and the associated numbers and information without identifying the one party as an ICE contact when the particular phone number does not match the phone number of the communication device.

12. The communication device of claim 11, where the automatically included ICE contact entry is preprogrammed in the memory.

13. The communication device of claim 11, where a plurality of names and associated numbers are linked to the ICE contact entry.

14. The communication device of claim 11, where the processor is further configured to:
receive input from a user to display the parties and the associated numbers and the linking information to the ICE contact entry.

15. A method comprising:
receiving, by a communication device, a contact list including names and associated numbers, wherein the contact list includes an emergency contact entry that is associated with a particular phone number of a particular communication device and that links at least one of the names and associated numbers to the emergency contact entry;
receiving, by the communication device, a request to present the contact list;
comparing, by the communication device, a phone number of the communication device with the particular phone number;
displaying, by the communication device and in response to the request to present the contact list, the at least one of the names and associated phone numbers with information relating to the emergency contact designator when the phone number of the communication device matches the particular phone number; and
displaying, by the communication device and in response to the request to present the contact list, the at least one of the names and associated phone numbers without information relating to the emergency contact designator when the phone number of the communication device does not match the particular phone number.

16. The method of claim 15, further comprising:
storing the information that links at least one name and associated number to the emergency contact entry in the contact list.

17. The method of claim 15, further comprising:
displaying the information that identifies the names and associated numbers associated with the emergency entry.

18. The method of claim 15, further comprising:
transferring the contact list to another communication device,. where the other communication device receives and stores the contact list with the emergency related information associated with the particular phone number.

* * * * *